(12) United States Patent
Kim

(10) Patent No.: US 11,161,552 B2
(45) Date of Patent: Nov. 2, 2021

(54) SIDE-OUTER REINFORCEMENT PANEL OF VEHICLE

(71) Applicants: Hyundai Motor Company, Seoul (KR); Kia Motors Corporation, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/892,494

(22) Filed: Jun. 4, 2020

(65) Prior Publication Data

US 2021/0171113 A1 Jun. 10, 2021

(30) Foreign Application Priority Data

Dec. 9, 2019 (KR) .......................... 10-2019-0162907

(51) Int. Cl.
| | |
|---|---|
| *B62D 25/04* | (2006.01) |
| *B62D 25/06* | (2006.01) |
| *B62D 27/02* | (2006.01) |
| *B62D 25/14* | (2006.01) |
| *B62D 25/02* | (2006.01) |

(52) U.S. Cl.
CPC ............. *B62D 25/04* (2013.01); *B62D 25/02* (2013.01); *B62D 25/06* (2013.01); *B62D 25/14* (2013.01); *B62D 27/023* (2013.01)

(58) Field of Classification Search
CPC ........ B62D 25/02; B62D 25/04; B62D 25/06; B62D 25/14; B62D 27/023
USPC .. 296/203.01, 203.02, 203.03, 209, 205, 29, 296/30
See application file for complete search history.

(56) References Cited

U.S. PATENT DOCUMENTS

| | | | | |
|---|---|---|---|---|
| 5,352,011 | A * | 10/1994 | Kihara | ................... B62D 23/00 296/203.03 |
| 2016/0236714 | A1* | 8/2016 | Tatsuwaki | .......... B62D 25/2045 |

FOREIGN PATENT DOCUMENTS

KR 20020078031 A 10/2002

* cited by examiner

*Primary Examiner* — Dennis H Pedder
(74) *Attorney, Agent, or Firm* — Slater Matsil, LLP

(57) ABSTRACT

A side-outer reinforcement panel of a vehicle that is coupled to a car body of a space frame structure including a roof carrier, a dash, and a side sill is provided. The side-outer reinforcement panel includes an upper flange extending in a front-rear direction of the vehicle, connected to the roof carrier, and supporting the roof carrier, a lower flange extending in the front-rear direction of the vehicle and connected to the side sill, a front pillar connecting the upper flange and the lower flange in an up and down direction, the front pillar also connected to the dash, and a center pillar disposed behind the front pillar, the center pillar connecting the upper flange and the lower flange in the up and down direction and having an upper end connected to the roof carrier and a lower end connected to the side sill.

20 Claims, 10 Drawing Sheets

SIDE-OUTER REINFORCEMENT PANEL OF VEHICLE

CROSS-REFERENCE TO RELATED APPLICATIONS

This application claims priority to Korean Patent Application No. 10-2019-0162907, filed on Dec. 9, 2019, which application is hereby incorporated herein by reference.

TECHNICAL FIELD

The present disclosure relates to a side-outer reinforcement panel of a vehicle.

BACKGROUND

Recently, modularized car bodies have been developed and applied to support the trend toward electric vehicles and requirements to reduce manufacturing costs.

In particular, with regard to the panel parts that are used for vehicles, since they are manufactured in integrated single panel types through drawing or form-drawing, it is impossible to change the lengths (front-rear, left-right, up-down lengths) of the integrated panels when the kind of a vehicle is changed, so common use is impossible, and particularly, it is required to change molds because it is required to change the entire design. Accordingly, there is a limitation on manufacturing vehicles according to a smart-factory concept, so there is a disadvantage in that excess manufacturing costs are incurred.

Accordingly, it is required to change the design into a structure composed of several separate parts rather than an integrated panel structure for portions for which many panel parts are used in vehicle so that the lengths can be changed, if necessary, and the degree of common use can be maximized.

To this end, recently, a car body having a space frame structure coupled to make the car body after a roof carrier, a dash, and a side sill, etc. of a vehicle are manufactured in a tube shape through intrusion has been developed.

When a car body is manufactured in a space frame structure, as described above, existing side-outer reinforcement panels have no structure for sufficiently supporting the tube-shaped roof carrier and have no structure for connecting the tube-shaped dash and the side sill, and thus there is a defect in that the rigidity of the entire car body is low.

The description provided above of a related art of the present disclosure is just for helping understanding of the background of the present disclosure and should not be construed as being included in the related art known by those skilled in the art.

SUMMARY

The present disclosure relates to a side-outer reinforcement panel of a vehicle. Particular embodiments relate to a side-outer reinforcement panel of a vehicle that is coupled to a car body having a space frame structure including a roof carrier, a dash, and a side sill that are manufactured in a tube shape.

An embodiment of the present disclosure is to further improve the rigidity and durability of a car body by providing a side-outer reinforcement panel of a vehicle that is coupled to a car body having a space frame structure including a roof carrier, a dash, and a side sill that are manufactured in a tube shape.

In view of the foregoing, a side-outer reinforcement panel of a vehicle according to embodiments of the present disclosure is coupled to a car body of a space frame structure including a roof carrier, a dash, and a side sill manufactured in a tube shape. The side-outer reinforcement panel includes an upper flange extending in a front-rear direction of the vehicle, connected to the roof carrier, and supporting the roof carrier, a lower flange extending in the front-rear direction of the vehicle and connected to the side sill, a front pillar connecting up and down the upper flange and the lower flange and connected to the dash, and a center pillar disposed behind the front pillar, connecting up and down the upper flange and the lower flange, and having an upper end connected to the roof carrier and a lower end connected to the side sill.

The upper flange may be in surface contact with a lower end of the roof side tube of the roof carrier in the front-rear direction of the vehicle.

A front end of the front pillar may be directly coupled to the outer side of the dash of the vehicle, a rear end of the front pillar may be coupled to a rear end of a connecting bracket, and a front end of the connecting bracket may be coupled to an inner side of the dash.

A space surrounded by the front pillar, the connecting bracket, and the dash may form a closed cross-section.

The center pillar may include a center-pillar outer panel and a center-pillar inner panel, the center-pillar outer panel may have an upper end being in surface contact with the roof side tube of the roof carrier and a lower end being in surface contact with the side sill, the center-pillar inner panel may have an upper end being in surface contact with the roof side tube of the roof carrier and a lower end coupled to an upper end of a center-pillar inner lower panel, and a lower end of the center-pillar inner lower panel may be in surface contact with the side sill.

A space surrounded by the roof side tube, the center-pillar outer panel, the center-pillar inner panel, the center-pillar inner lower panel, and the side sill may form a closed cross-section.

The side-outer reinforcement panel may further include a glass support extending in the front-rear direction of the vehicle, positioned over the upper flange, and having an end being in surface contact with the roof side tube of the roof carrier and the other end overlapping a side-outer panel and supporting the front windshield glass.

The side-outer reinforcement panel may further include a first reinforcement portion and a second reinforcement portion that extend in the front-rear direction of the vehicle, are positioned over the upper flange, and each having an end being in surface contact with the roof side tube of the roof carrier, in which the other end of the first reinforcement portion and the other end of the second reinforcement portion may overlap a top surface and a bottom surface of a first roof rail and a top surface and a bottom surface of a second roof rail, respectively, at portions where the first reinforcement portion and the second reinforcement portion overlap the first roof rail and the second roof rail of the roof carrier.

The other end of the first reinforcement portion and the other end of the second reinforcement portion may overlap each other and may be coupled to the roof panel through a connecting member at portions where the first reinforcement portion and the second reinforcement portion do not overlap the first roof rail and the second roof rail.

The side-outer reinforcement panel according to an embodiment of the present disclosure described above is coupled to a car body of a space frame structure including the roof carrier, the dash, and the side sill manufactured in a tube shape, thereby supporting the roof carrier and being firmly coupled to the dash and the side sill. Accordingly, there is an effect that it is possible to greatly improve the strength, rigidity, and durability of the car body having the space frame structure.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

A side-outer reinforcement panel of a vehicle according to an exemplary embodiment of the present disclosure is described hereafter in detail with reference to the accompanying drawings.

Figure 1:
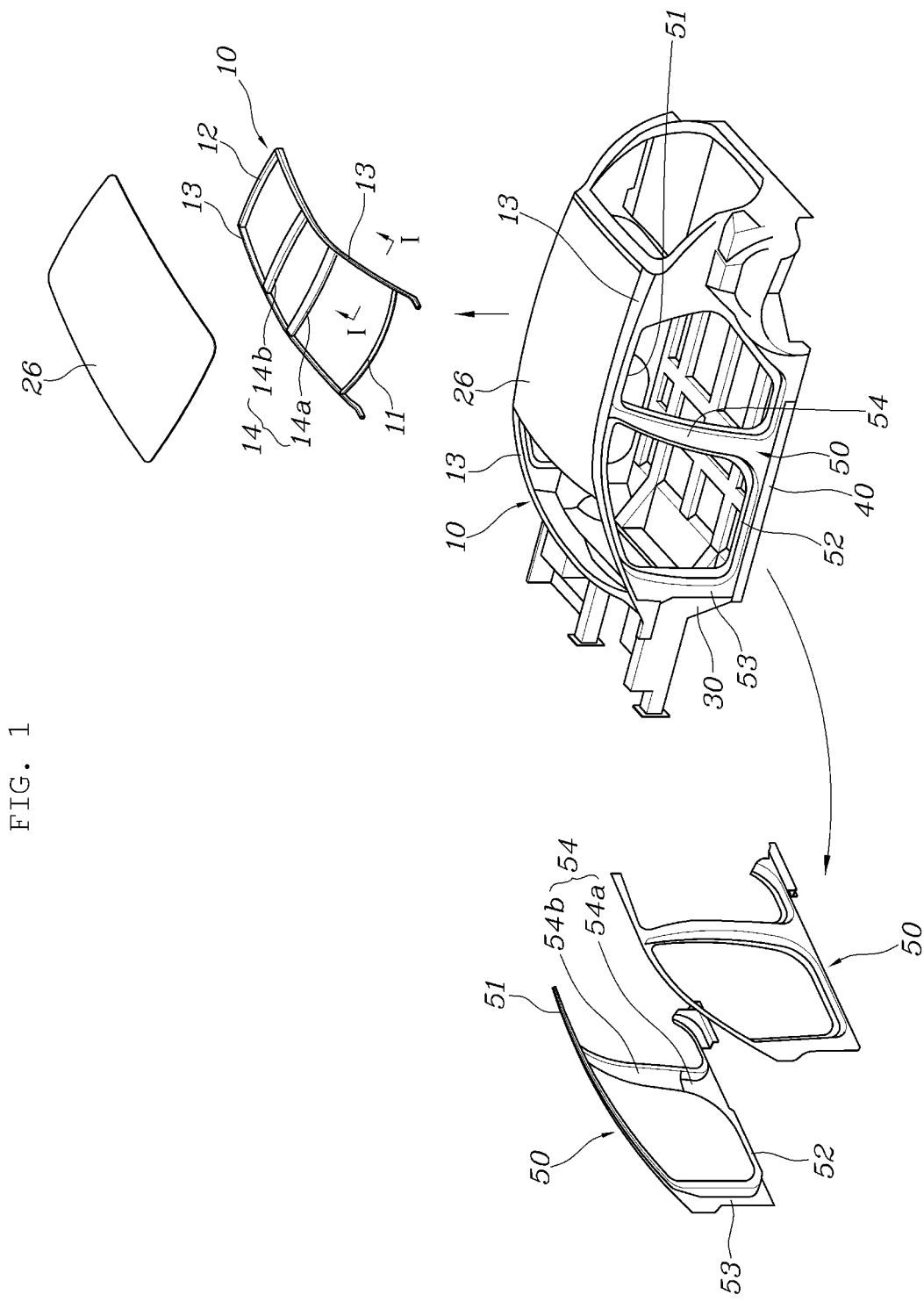
FIG. 1 is a perspective view of a car body to which a side-outer reinforcement panel according to embodiments of the present disclosure is coupled.
Figure 2:
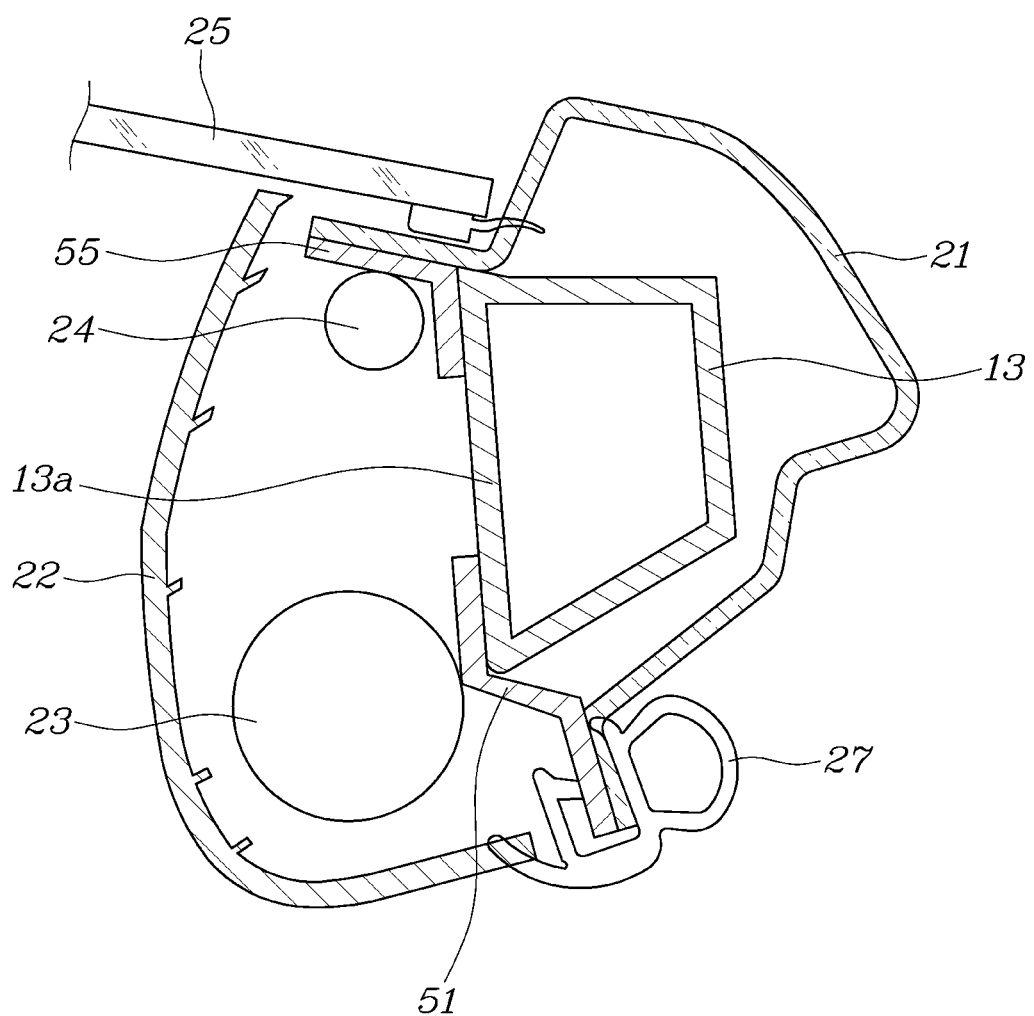
FIG. 2 is a cross-sectional view taken along the line I-I of FIG. 1.

Referring to FIGS. 1 and 2, a roof carrier 10 of a vehicle includes roof side tubes 13 forming a closed cross-section, extending rearward to both sides of a rear roof rail 12 from both sides of a cowl 11 at the front of a vehicle, and disposed on both sides of a car body, and one or more middle roof rails 14 forming a closed cross-section, extending in the transverse direction of the vehicle, and connecting the roof side tubes 13 at both sides between the cowl 11 and the rear roof rail 12.

That is, a front pillar (A-pillar) and roof side members that are common separate parts in the related art are integrated as one part by the roof side tubes 13 having a hollow closed cross-section, and similarly, the cowl 11, the middle roof rails 14, and the rear roof rail 12 that each have a hollow cross-sectional structure are sequentially coupled rearward to the roof side tubes 13 from the front of the vehicle, whereby the roof carrier 10 has an integrated space frame structure, as shown in FIG. 1.

In particular, the closed cross-section of the roof side tubes 13 is manufactured by forming one tube through hydroforming or hot blowing rather than combining two or more panels through welding, etc. in the related art, whereby the space frame structure can be achieved.

The roof side tubes 13 having the structure described above can be easily applied to other kinds or models of vehicles by longitudinally stretching or contracting.

The closed cross-section of the roof side tubes 13 may have a single closed curve by sequentially connecting four or more straight portions through bending portions.

For example, in the embodiment shown in FIG. 2, the roof side tubes 13 have one closed curve shape by sequentially connecting a total of four straight portions through bending portions.

Accordingly, the closed cross-sectional shape of the roof side tubes 13 has a rectangular structure, so the roof side tubes 13 can be easily brought in surface contact with adjacent parts, whereby the degree of matching and assembling of parts can be improved.

Further, since the cross-sectional shape of the roof side tubes 13 is a rectangular shape, a relatively wide cross-sectional area can be secured in a space allowed to accommodate the cross-section of the roof side tubes 13, so the rigidity and strength of the roof side tubes 13 can be further improved.

The roof side tubes 13 gradually change into a shape that occupies the space formed inside a side-outer panel 21 disposed outside the roof side tubes 13 as large as possible while easily securing the surface contact state with an adjacent part in the longitudinal direction of the car body with the four straight portions and bending portions of the closed cross-section maintained.

As described above, since the roof side tubes 13 easily secure the surface contact with adjacent parts, the degree of assembling of the car body is improved. Further, since the cross-sectional area of the roof side tubes 13 is maximally increased within an allowable extent, the strength and rigidity of the roof side tubes 13 are improved.

Only the shape of the cross-section of the roof side tubes 13 can be gradually changed into necessary shapes in accordance with the position with the cross-sectional area maintained in the longitudinal direction of the vehicle.

Further, the closed cross-section of the roof side tubes 13 may be considered as a structure protruding in a shape such that other straight portions occupy the space inside the side-outer panel 21 as large as possible from an inner straight portion 13a of the car body.

Such a cross-sectional structure of the roof side tubes 13, as described above, makes it possible to easily secure the surface contact state with adjacent parts, increase the strength and rigidity by increasing the cross-sectional area thereof, and further improve the rigidity and strength of the roof carrier for a vehicle by most easily and strongly combining the cowl 11, the middle roof rails 14, and the rear roof rail 12 that are coupled inside the roof side tubes 13.

Both ends of each of the cowl 11, the middle roof rails 14, and the rear roof rail 12 can be perpendicularly in surface contact with the inner straight portions 13a of the roof side tube 13, so they can be easily assembled and combined, and it is possible to secure high strength and rigidity, as compared with when they are coupled to the roof side panels 13 at an angle.

The side-outer panel 21 is positioned outside the roof side tubes 13 and may be made of a material such as plastic, so it is possible to freely make the external appearance of a vehicle.

A front pillar trim 22 is installed inside the roof side tubes 13, and an airbag 23, a wire ring 24, etc. may be installed in the space formed between the front pillar trim 22 and the roof side tubes 13.

Meanwhile, the one or more middle roof rails 14 include a first roof rail 14a installed at position supporting the upper end of a front windshield glass 25.

That is, the middle roof rails 14 necessarily include the first roof rail 14a, and may or may not further include an additional middle roof rail 14, depending on the kinds or models of vehicles.

For reference, a second roof rail 14b that is an additional middle roof rail 14 is included in the first embodiment shown in FIG. 1.

The first roof rail 14a and the second roof rail 14b, as described above, each may be coupled such that both ends are perpendicularly in surface contact with the inner straight portions 13a of the roof side tubes 13.

The rear roof rail 12 extends in the transverse direction of the vehicle while forming a closed cross-section having one or more closed curves and both ends thereof may be coupled to be perpendicularly in surface contact with the inner straight portions 13a of the roof side tubes 13.

The first roof rail 14a and the second roof rail 14b of the middle roof rail 14 and the rear roof rail 12 are all formed such that predetermined closed cross-sections extend in the transverse direction of the vehicle, can be manufactured through roll-forming or variable extrusion of aluminum, and can be easily changed in length, so they can be easily applied to other kinds or models of vehicles.

That is, the roof carrier 10 described above can be easily applied to other kinds or models of vehicles and can be easily used in common for multiple kinds of vehicles by adjusting the lengths of the cowl 11, the middle roof rails 14, and the rear roof rail 12 in the transverse direction of the vehicle and the length of the roof side tubes 13 in the longitudinal direction of the vehicle, so it is possible to more easily develop new kinds of vehicles and they can be effectively applied to the way of manufacturing various kinds of products in small quantities.

Further, since the roof carrier 10 described above has a space frame in which all parts are connected to each other in a tube shape, as described above, it is possible to secure relatively high rigidity with a relatively small weight.

A roof panel 26 made of plastic is coupled to the top of the roof carrier 10, thereby completing the roof of the vehicle.

For reference, the cowl 11, the middle roof rails 14, and the rear roof rail 12 are all perpendicularly coupled in surface contact with the inner straight portions 13a of the roof side tubes 13 by welding, in which CO2 welding or laser welding may be used.

In an embodiment according to the present disclosure, a dash 30 disposed at the front of the vehicle and a side sill 40, similar to the roof carrier 10, are formed in a space frame structure in which they are manufactured and connected in a tube shape.

The roof carrier 10, the dash 30, and the side sill 40 are all formed by extrusion such that they have a lattice structure cross-section or a honeycomb shape cross-section, so the rigidity and strength of the car body can be improved by the lattice structure cross-section or the honeycomb shape cross-section.

The side-outer reinforcement panel 50 of a vehicle according to embodiments of the present disclosure is, as shown in FIGS. 1 to 10, coupled to a car body of a space frame structure including the roof carrier 10, the dash 30, and the side sill 40 manufactured in a tube shape, and includes an upper flange 51 extending in the front-rear direction of a vehicle, connected to the roof carrier 10, and supporting the roof carrier 10, a lower flange 52 extending in the front-rear direction of the vehicle and connected to the side sill 40, a front pillar (A-pillar) 53 connecting the upper flange 51 and the lower flange 52 in an up and down direction and connected to the dash 30, and a center pillar 54 (B-pillar) disposed behind the front pillar 53, connecting the upper flange 51 and the lower flange 52 in the up and down direction, and having an upper end connected to the roof carrier 10 and a lower end connected to the side sill 40.

As shown in FIG. 2, the lower portion of the upper flange 51 overlaps the lower portion of the side-outer panel 21, so a weather strip 27 can be coupled to the portion.

Further, the upper flange 51 of the side-outer reinforcement panel 50 is coupled in surface contact with the lower end of the roof side tube 13 of the roof carrier 10 shown in FIG. 2 in the front-rear direction of the vehicle.

That is, the upper end of the upper flange 51 is coupled in surface contact with the inner straight portion 13a of the roof side tube 13 of the roof carrier 10 by welding, so high coupling force can be secured.

Figure 3:
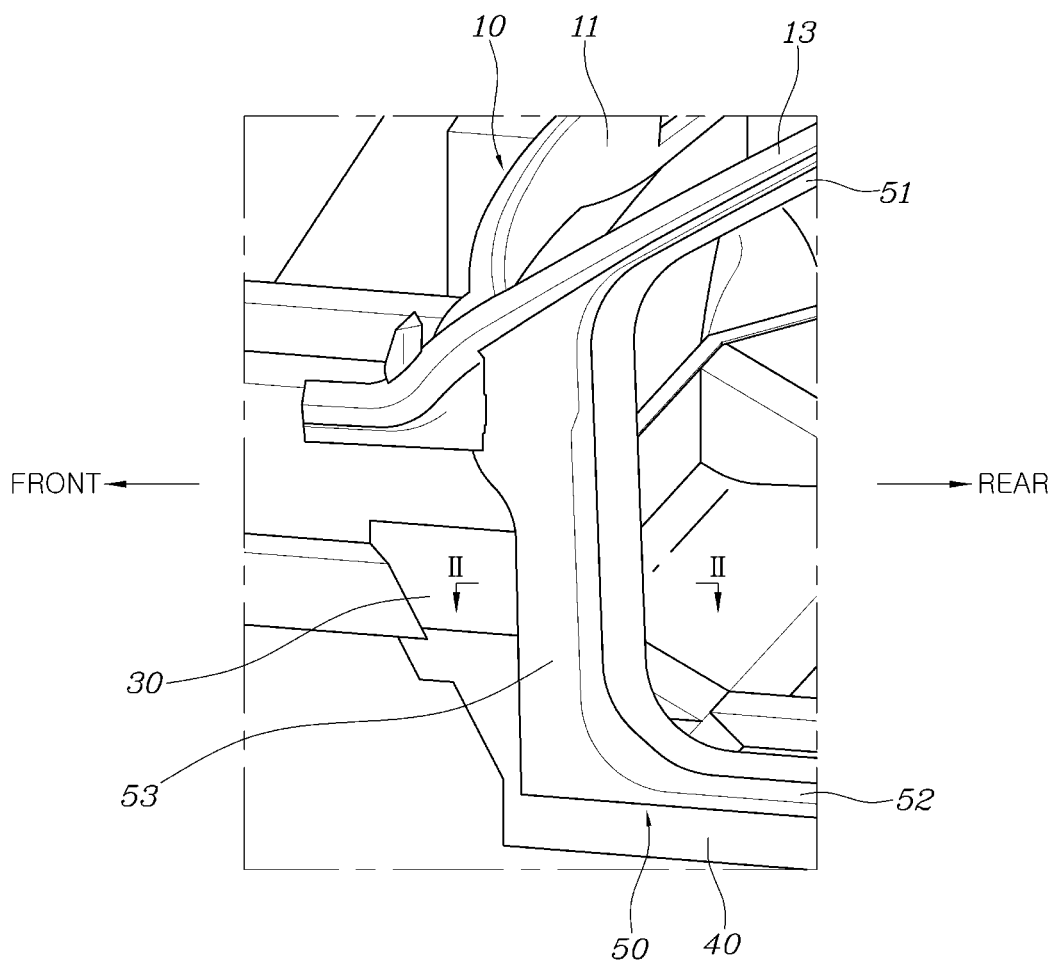
FIG. 3 is a view showing the portion to which a front pillar of the side-outer reinforcement panel is coupled in accordance with embodiments of the present disclosure.
Figure 4:
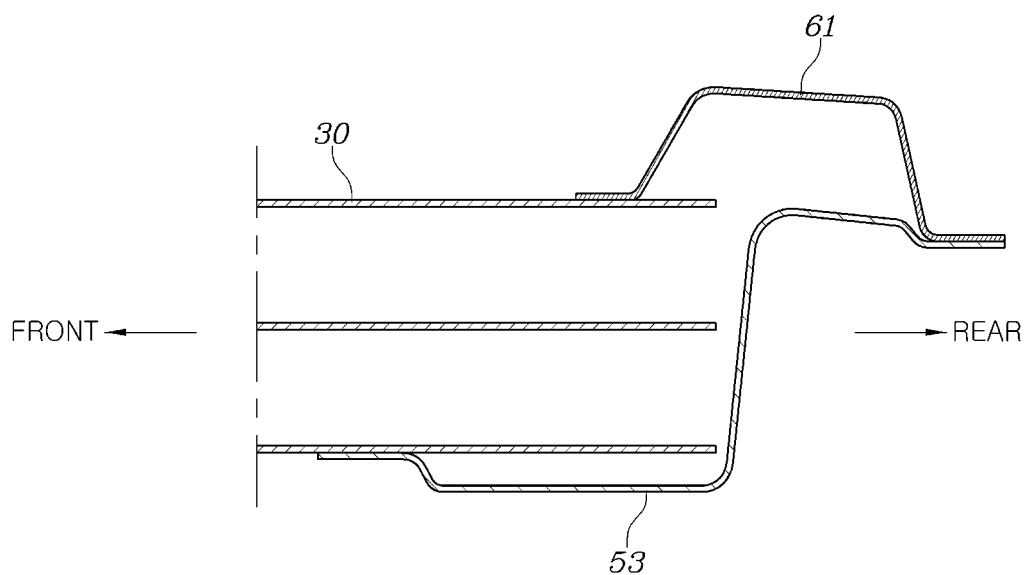
FIG. 4 is a cross-sectional view taken along the line II-II of FIG. 3.

As shown in FIGS. 3 and 4, the front end of the front pillar 53 of the side-outer reinforcement panel 50 is directly coupled to the outer side of the dash 30 of the vehicle, the rear end of the front pillar 53 is coupled to the rear end of a connecting bracket 61, and the front end of the connecting bracket 61 is coupled to the inner side of the dash 30, whereby the space surrounded by the front pillar 53, the connecting bracket 61, and the dash 30 forms a closed cross-section. Accordingly, strength and rigidity can be secured.

Further, the center pillar 54 of the side-outer reinforcement panel 50, as shown in FIG. 1 and FIGS. 5 to 7, includes a center-pillar outer panel 54a and a center-pillar inner panel 54b.

The center-pillar outer panel 54a has an upper end being in surface contact with the roof side tube 13 of the roof carrier 10 and a lower end being in surface contact with the side sill 40.

The center-pillar inner panel 54b has an upper end being in surface contact with the roof side tube 13 of the roof carrier 10 and a lower end coupled to the upper end of a center-pillar inner lower panel 62, and the lower end of the center-pillar inner lower panel 62 is in surface contact with the side sill 40.

Accordingly, the space surrounded by the roof side tube 13, the center-pillar outer panel 54a, the center-pillar inner panel 54b, the center-pillar inner lower panel 62, and the side sill 40 forms a closed cross-section, so strength and rigidity can be secured.

An embodiment of the present disclosure further includes a glass support 55 extending in the front-rear direction of the vehicle, and as shown in FIG. 2, positioned over the upper flange 51 and having an end being in surface contact with the inner supporting portion 13a of the roof side tube 13 of the roof carrier 10 and the other end overlapping the side-outer panel 21 and supporting the front windshield glass 25.

Since the lower portion of the front windshield glass 25 is supported by the glass support 55, the front windshield glass 25 can be installed by stronger coupling force.

An embodiment of the present disclosure, as shown in FIGS. 5, 6, 8, and 9, further includes a first reinforcement portion 57 and a second reinforcement portion 58 that extend in the front-rear direction of the vehicle, are positioned over the upper flange 51, and each have an end being in surface contact with the roof side tube 13 of the roof carrier 10.

The other end of the first reinforcement portion 57 and the other end of the second reinforcement portion 58 overlap the top surface and the bottom surface of the first roof rail 14a and the top surface and the bottom surface of the second roof rail 14b, respectively, at the portions where the first reinforcement portion 57 and the second reinforcement portion 58 overlap the first roof rail 14a and the second roof rail 14b of the roof carrier 10, so the strength and rigidity can be further improved.

Figure 5:
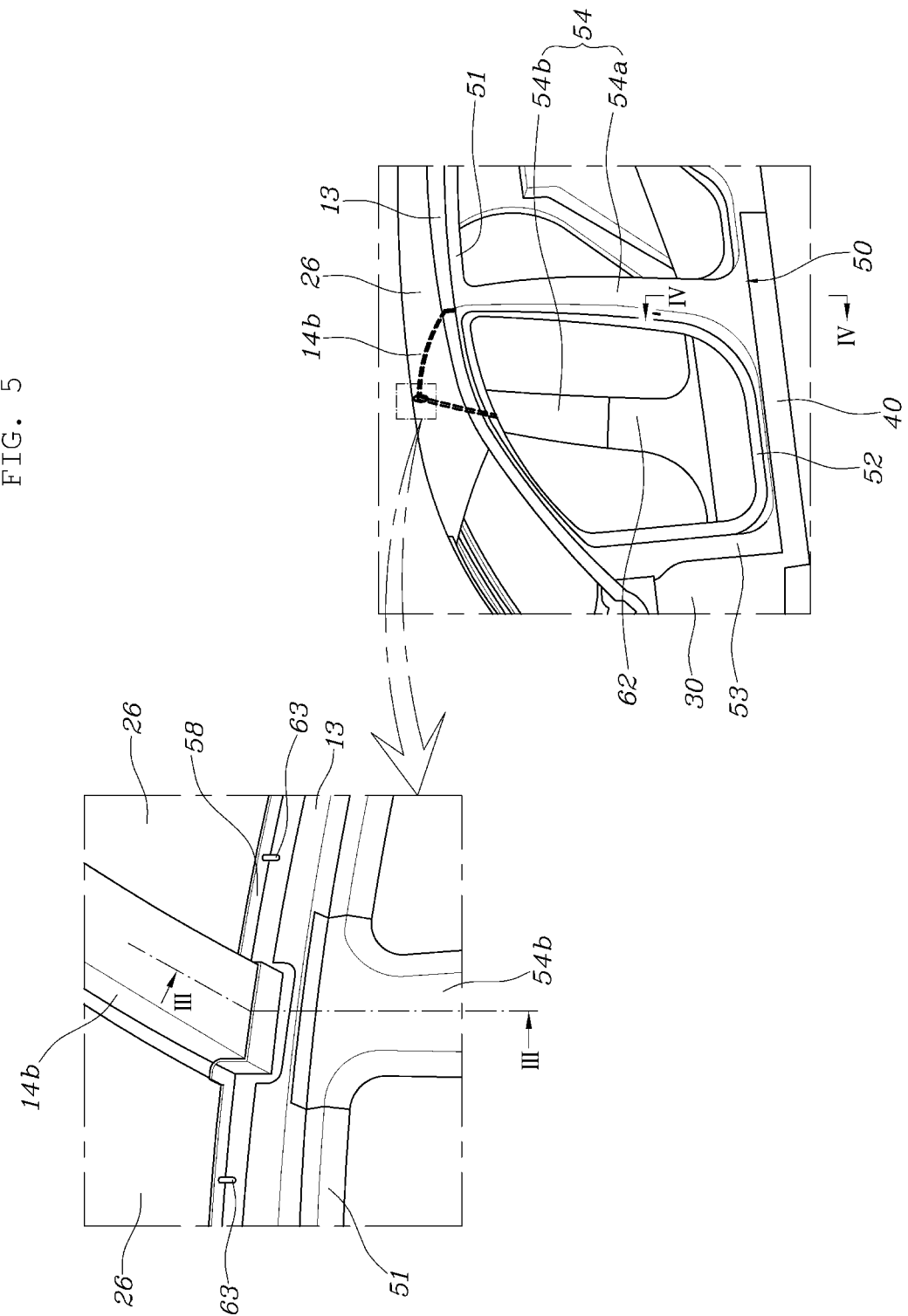
FIG. 5 is a view showing the portion to which a center pillar of the side-outer reinforcement panel is coupled in accordance with embodiments of the present disclosure.
Figure 6:
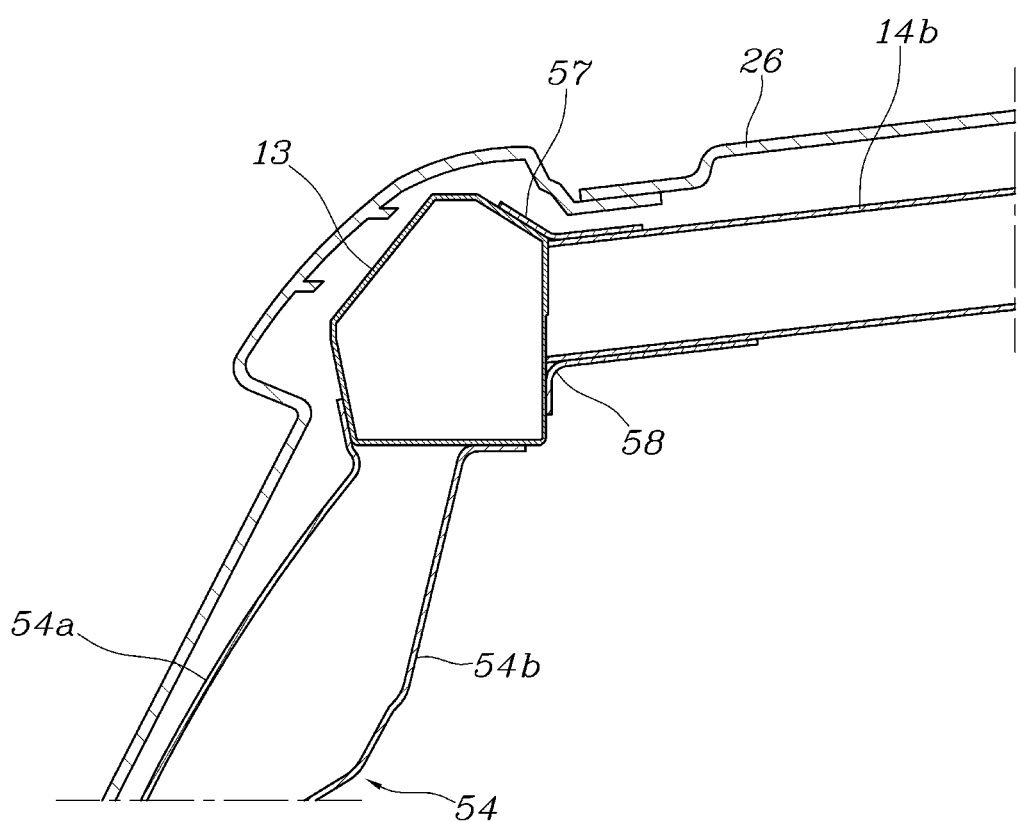
FIGS. 6 and 7 are cross-sectional views taken along lines III-III and VI-VI of FIG. 5, respectively.
Figure 7:
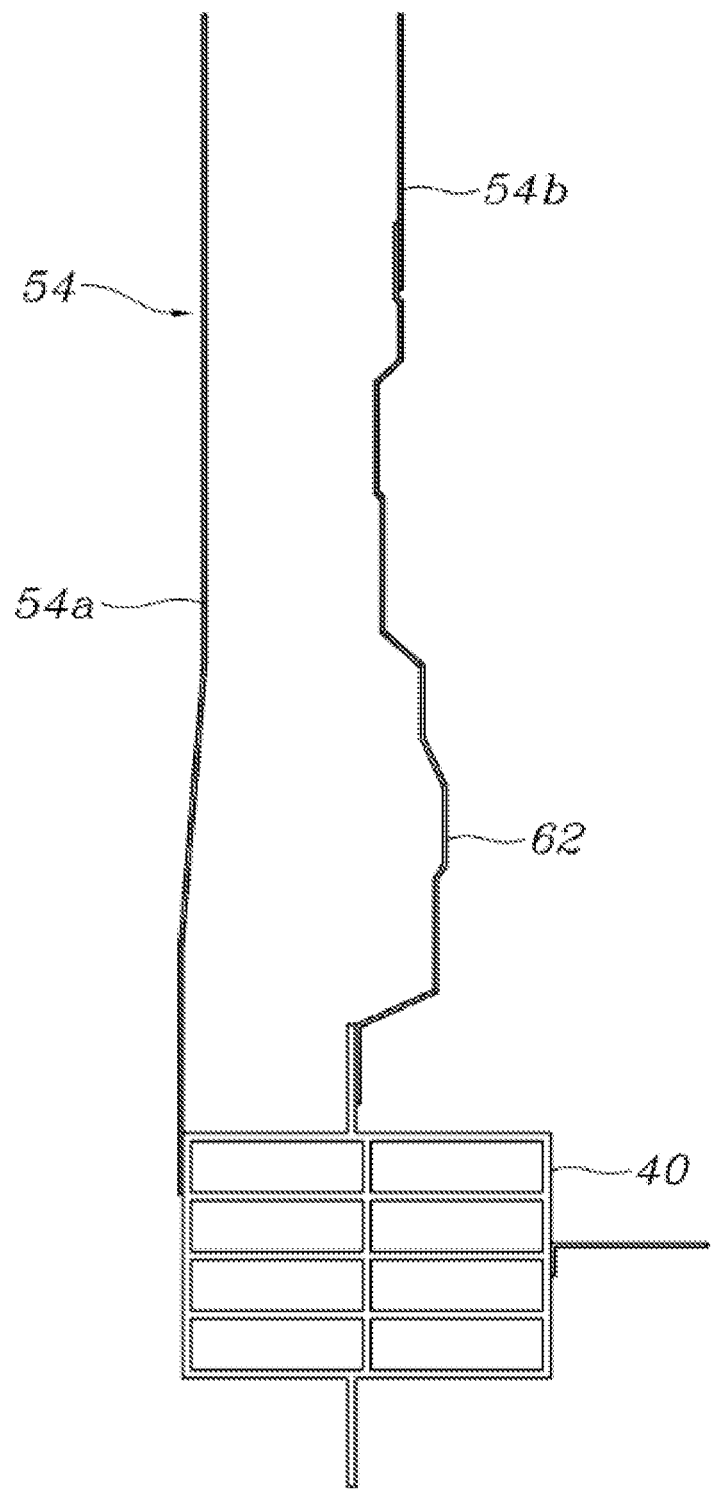
Figure 8:
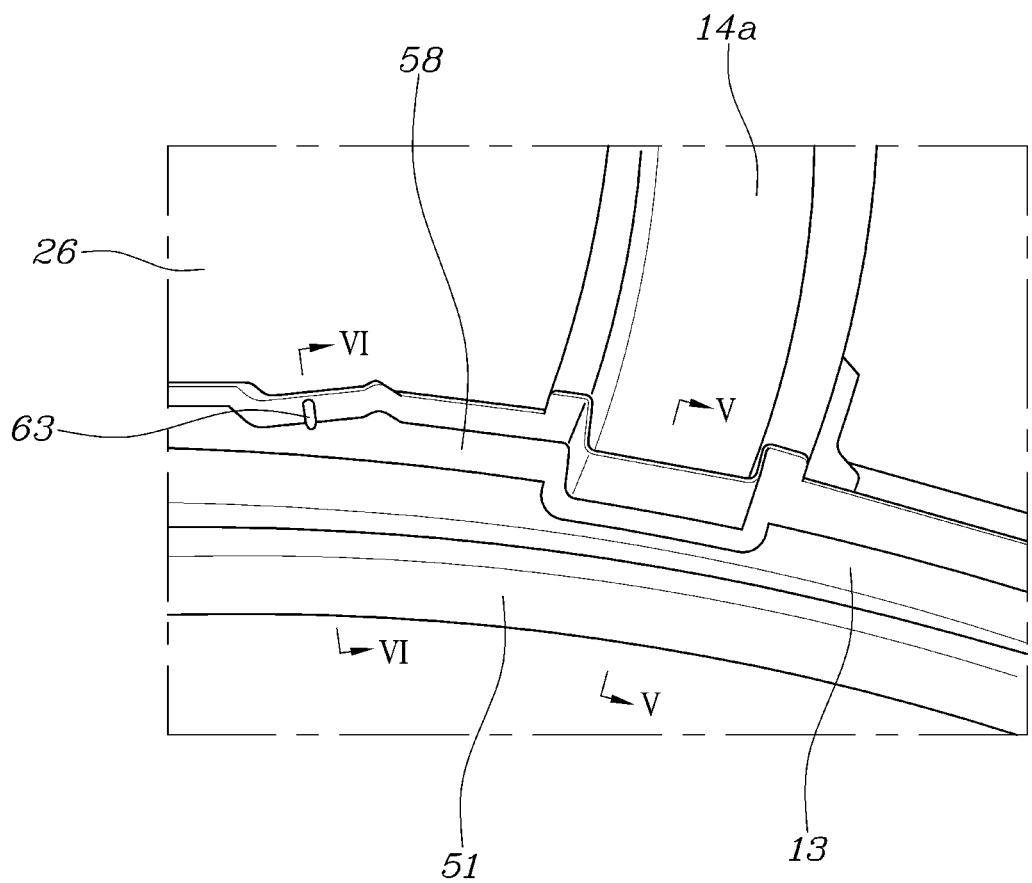
FIG. 8 is a view showing the portion to which a first roof rail is coupled in accordance with embodiments of the present disclosure.
Figure 9:
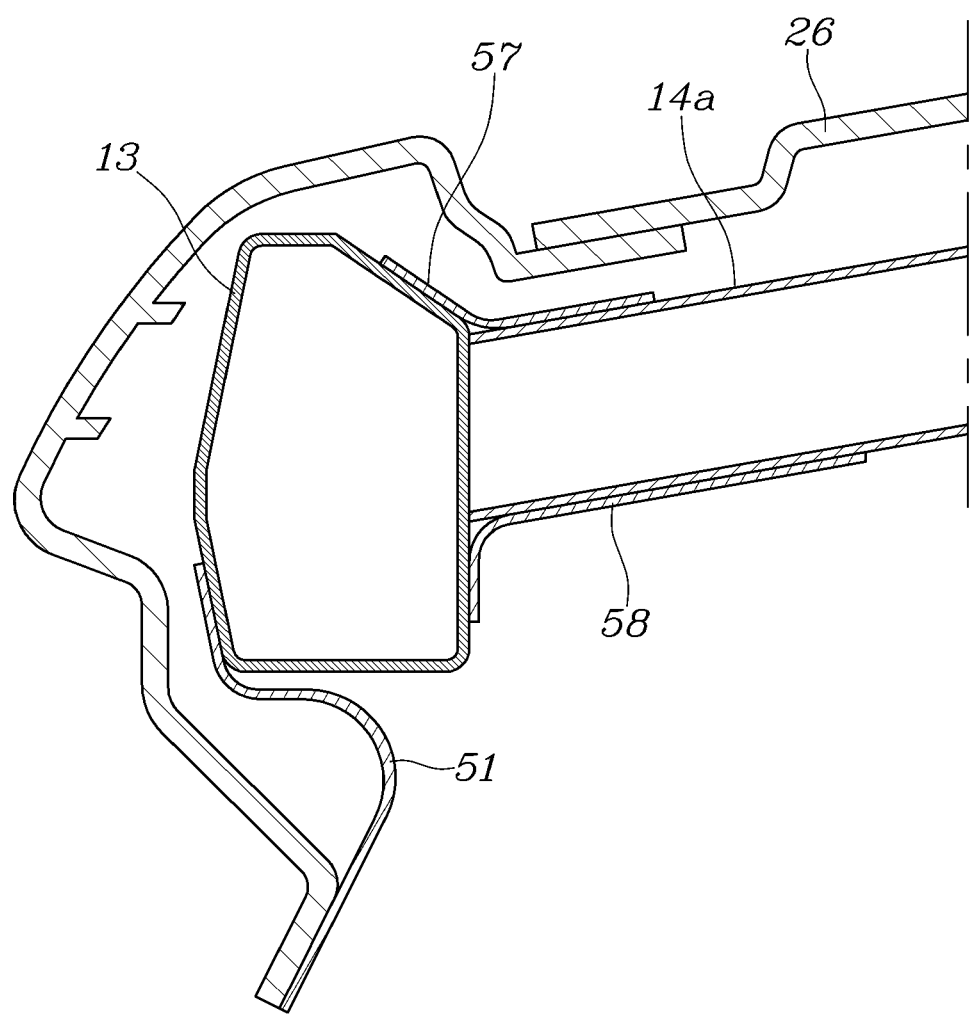
FIGS. 9 and 10 are cross-sectional views taken along lines V-V and VI-VI of FIG. 8, respectively.
Figure 10:
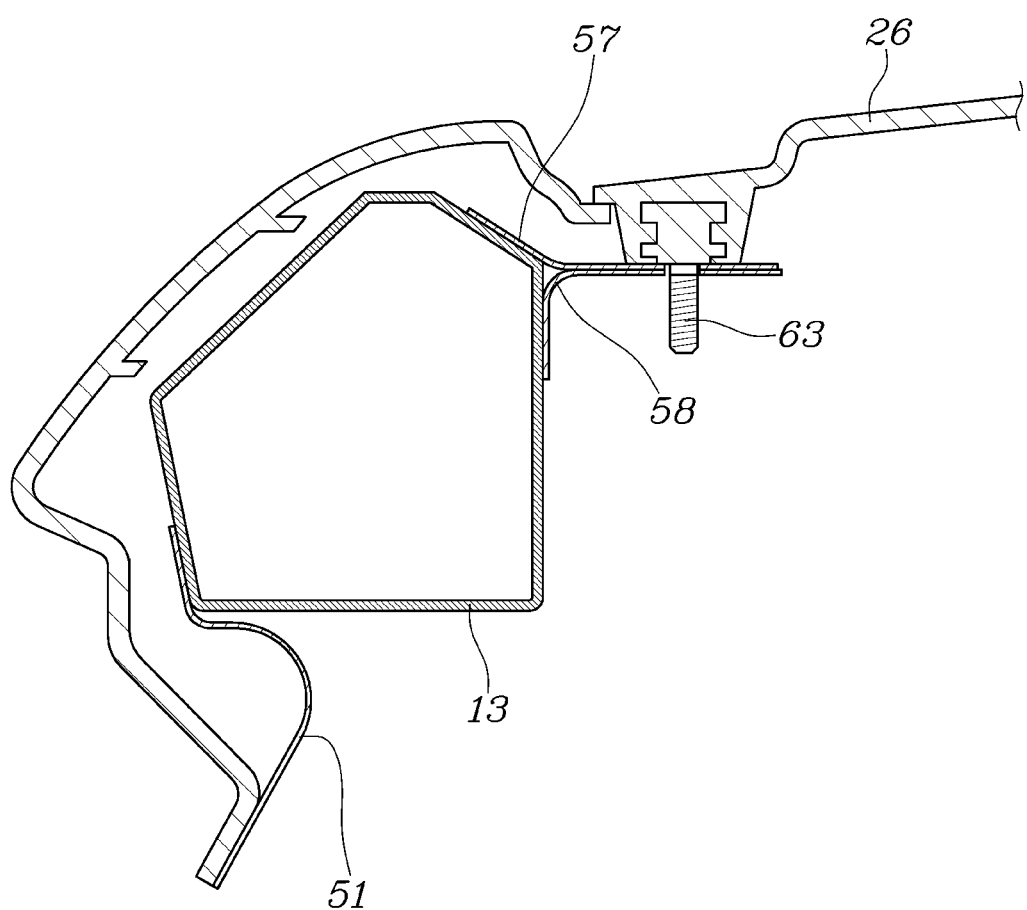

Further, as shown in FIGS. 5, 8, and 10, the other end of the first reinforcement portion 57 and the other end of the second reinforcement portion 58 overlap each other and are coupled to the roof panel 26 through the connecting member 63 at the portions where the first reinforcement portion 57 and the second reinforcement portion 58 do not overlap the first roof rail 14a and the second roof rail 14b, so the strength and rigidity of the roof panel 26 can be improved.

The side-outer reinforcement panel 50 according to an embodiment of the present disclosure described above is coupled to a car body of a space frame structure including the roof carrier 10, the dash 30, and the side sill 40 manufactured in a tube shape, thereby supporting the roof carrier 10 and being firmly coupled to the dash 30 and the side sill 40. Accordingly, there is the advantage that it is possible to greatly improve the strength, rigidity, and durability of the car body having the space frame structure.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A side-outer reinforcement panel of a vehicle that is coupled to a car body of a space frame structure that includes a roof carrier, a dash, and a side sill manufactured in a tube shape, the side-outer reinforcement panel comprising:
    an upper flange extending in a front-rear direction of the vehicle, connected to the roof carrier, and supporting the roof carrier, wherein the upper flange is in surface contact with a lower end of a roof side tube of the roof carrier in the front-rear direction of the vehicle;
    a lower flange extending in the front-rear direction of the vehicle and connected to the side sill;
    a front pillar connecting the upper flange and the lower flange in an up and down direction, the front pillar also connected to the dash; and
    a center pillar disposed behind the front pillar, the center pillar connecting the upper flange and the lower flange in the up and down direction and having an upper end connected to the roof carrier and a lower end connected to the side sill.

2. The side-outer reinforcement panel of claim 1, wherein:
    a front end of the front pillar is directly coupled to an outer side of the dash of the vehicle;
    a rear end of the front pillar is coupled to a rear end of a connecting bracket; and
    a front end of the connecting bracket is coupled to an inner side of the dash.

3. The side-outer reinforcement panel of claim 2, wherein a space surrounded by the front pillar, the connecting bracket, and the dash is a closed cross-section.

4. The side-outer reinforcement panel of claim 1, wherein:
    the center pillar includes a center-pillar outer panel and a center-pillar inner panel;
    the center-pillar outer panel has an upper end being in surface contact with a roof side tube of the roof carrier and a lower end being in surface contact with the side sill;
    the center-pillar inner panel has an upper end being in surface contact with the roof side tube of the roof carrier and a lower end coupled to an upper end of a center-pillar inner lower panel; and
    a lower end of the center-pillar inner lower panel is in surface contact with the side sill.

5. The side-outer reinforcement panel of claim 4, wherein a space surrounded by the roof side tube, the center-pillar outer panel, the center-pillar inner panel, the center-pillar inner lower panel, and the side sill is a closed cross-section.

6. The side-outer reinforcement panel of claim 1, further comprising a glass support extending in the front-rear direction of the vehicle, positioned over the upper flange, and having a first end in surface contact with a roof side tube of the roof carrier and a second end overlapping a side-outer panel and supporting a front windshield glass.

7. The side-outer reinforcement panel of claim 1, further comprising a first reinforcement portion and a second reinforcement portion that extend in the front-rear direction of the vehicle, are positioned over the upper flange, and have a first end being in surface contact with a roof side tube of the roof carrier,
    wherein a second end of the first reinforcement portion and a second end of the second reinforcement portion overlap a top surface and a bottom surface of a first roof rail and a top surface and a bottom surface of a second roof rail, respectively, at portions where the first reinforcement portion and the second reinforcement portion overlap the first roof rail and the second roof rail of the roof carrier.

8. The side-outer reinforcement panel of claim 7, wherein the second end of the first reinforcement portion and the second end of the second reinforcement portion overlap each other and are coupled to a roof panel through a connecting member at portions where the first reinforcement portion and the second reinforcement portion do not overlap the first roof rail and the second roof rail.

9. A vehicle comprising:
    a car body of a space frame structure, the car body comprising a roof carrier that includes a roof side tube, a dash, and a side sill; and
    a side-outer reinforcement panel coupled to the car body, wherein the side-outer reinforcement panel comprises:
        an upper flange extending in a front-rear direction of the vehicle, the upper flange being connected to and supporting the roof carrier, wherein the upper flange is in surface contact with a lower end of the roof side tube in the front-rear direction of the vehicle;
        a lower flange extending in the front-rear direction of the vehicle, the lower flange being connected to the side sill;
        a front pillar connecting the upper flange and the lower flange in an up and down direction, the front pillar also connected to the dash; and
        a center pillar disposed behind the front pillar, the center pillar connecting the upper flange and the lower flange in the up and down direction and having an upper end connected to the roof carrier and a lower end connected to the side sill.

10. The vehicle of claim 9, wherein the side sill has a tube shape.

11. The vehicle of claim 9, further comprising a connecting bracket having a front end coupled to an inner side of the dash, wherein:
    a front end of the front pillar is directly coupled to an outer side of the dash; and
    a rear end of the front pillar is coupled to a rear end of the connecting bracket.

12. The vehicle of claim 11, wherein a space surrounded by the front pillar, the connecting bracket, and the dash is a closed cross-section.

13. The vehicle of claim 9, wherein the roof carrier comprises a roof side tube and the center pillar comprises a center-pillar outer panel and a center-pillar inner panel, and wherein:
   the center-pillar outer panel has an upper end in surface contact with the roof side tube and a lower end in surface contact with the side sill;
   the center-pillar inner panel has an upper end in surface contact with the roof side tube and a lower end coupled to an upper end of a center-pillar inner lower panel; and
   a lower end of the center-pillar inner lower panel is in surface contact with the side sill.

14. The vehicle of claim 13, wherein a space surrounded by the roof side tube, the center-pillar outer panel, the center-pillar inner panel, the center-pillar inner lower panel, and the side sill is a closed cross-section.

15. The vehicle of claim 9, further comprising a glass support extending in the front-rear direction of the vehicle, positioned over the upper flange, and having a first end in surface contact with a roof side tube of the roof carrier and a second end overlapping a side-outer panel.

16. The vehicle of claim 15, further comprising a front windshield glass supported by the glass support.

17. The vehicle of claim 9, further comprising a first reinforcement portion and a second reinforcement portion each extending in the front-rear direction of the vehicle, positioned over the upper flange, and having a first end in surface contact with a roof side tube of the roof carrier,
   wherein a second end of the first reinforcement portion and a second end of the second reinforcement portion overlap a top surface and a bottom surface of a first roof rail and a top surface and a bottom surface of a second roof rail, respectively, at portions where the first reinforcement portion and the second reinforcement portion overlap the first roof rail and the second roof rail of the roof carrier.

18. The vehicle of claim 17, wherein the second end of the first reinforcement portion and the second end of the second reinforcement portion overlap each other and are coupled to a roof panel through a connecting member at portions where the first reinforcement portion and the second reinforcement portion do not overlap the first roof rail and the second roof rail.

19. A side-outer reinforcement panel of a vehicle that is coupled to a car body of a space frame structure that includes a roof carrier, a dash, and a side sill manufactured in a tube shape, the side-outer reinforcement panel comprising:
   an upper flange extending in a front-rear direction of the vehicle, connected to the roof carrier, and supporting the roof carrier;
   a lower flange extending in the front-rear direction of the vehicle and connected to the side sill;
   a front pillar connecting the upper flange and the lower flange in an up and down direction, the front pillar also connected to the dash;
   a center pillar disposed behind the front pillar, the center pillar connecting the upper flange and the lower flange in the up and down direction and having an upper end connected to the roof carrier and a lower end connected to the side sill; and
   a glass support extending in the front-rear direction of the vehicle, positioned over the upper flange, and having a first end in surface contact with a roof side tube of the roof carrier and a second end overlapping a side-outer panel and supporting a front windshield glass.

20. The side-outer reinforcement panel of claim 19, wherein:
   the center pillar includes a center-pillar outer panel and a center-pillar inner panel;
   the center-pillar outer panel has an upper end being in surface contact with a roof side tube of the roof carrier and a lower end being in surface contact with the side sill;
   the center-pillar inner panel has an upper end being in surface contact with the roof side tube of the roof carrier and a lower end coupled to an upper end of a center-pillar inner lower panel; and
   a lower end of the center-pillar inner lower panel is in surface contact with the side sill.

* * * * *